(12) United States Patent
Hosaka et al.

(10) Patent No.: US 6,353,199 B1
(45) Date of Patent: Mar. 5, 2002

(54) APPARATUS FOR ELECTRIC DISCHARGE MACHINING

(75) Inventors: Akio Hosaka, Fukui; Sadao Sano, Kanagawa; Yoichi Seki, Fukui, all of (JP)

(73) Assignees: Sodick Co., Ltd.; KHS Co., Ltd., both of Kanagawa (JP)

( * ) Notice: Subject to any disclaimer, the term of this patent is extended or adjusted under 35 U.S.C. 154(b) by 0 days.

(21) Appl. No.: 09/600,360

(22) PCT Filed: Nov. 17, 1999

(86) PCT No.: PCT/JP99/06414

§ 371 Date: Jul. 14, 2000

§ 102(e) Date: Jul. 14, 2000

(87) PCT Pub. No.: WO00/29161

PCT Pub. Date: May 25, 2000

(30) Foreign Application Priority Data

| Nov. 17, 1998 | (JP) | 10-327316 |
| Nov. 26, 1998 | (JP) | 10-336285 |
| Nov. 27, 1998 | (JP) | 10-337627 |
| Mar. 4, 1999 | (JP) | 11-057209 |

(51) Int. Cl.[7] .............................. B23H 1/00; B23H 7/30
(52) U.S. Cl. .................................... 219/69.11; 219/69.2
(58) Field of Search ........................... 219/69.11, 69.15, 219/69.2

(56) References Cited

FOREIGN PATENT DOCUMENTS

| JP | 2-83137 | * 3/1990 |
| JP | 5-104332 | 4/1993 |
| JP | 8-309620 | 11/1996 |

OTHER PUBLICATIONS

Translation of Japan Patent document 5–104,332 Aug. 2000.
Translation of Japan Patent document 8–309,620 Aug. 2000.

* cited by examiner

*Primary Examiner*—Geoffrey S. Evans
(74) *Attorney, Agent, or Firm*—McDermott, Will & Emery (57) ABSTRACT

An electric discharge machining apparatus comprises a quill 8 movable in the vertical direction, at least one set of linear motor movers attached to the quill, symmetrically about a center axis of the quill, and a single set of linear motor stators facing the set of movers. An electrode mounting device (9) for holding a tool electrode (6) is attached to a lower end of the quill, coaxially with the quill. Preferably, the set of movers includes magnetic plates (12, 14) attached to the quill and a row of permanent magnets (11, 13, 15, 16) arranged on the magnetic plates, and the set of stators includes a yoke (31, 41) and a coil (32, 42) wound around the yoke. The quill has a hole (8a) in its center extending in the vertical direction, and an air cylinder (61) providing counter balance for the load of the quill is preferably disposed in this hole. The quill has a density of $4g/cm^3$ or less, and is made of, for example, silicon nitride ($Si_3N_4$) ceramics or a composite material of a light metal and at least 40% by volume of ceramics.

17 Claims, 13 Drawing Sheets

APPARATUS FOR ELECTRIC DISCHARGE MACHINING

FIELD OF THE INVENTION

The present invention relates to an electric discharge machining apparatus for forming holes of various shape in a workpiece by causing electric discharge between a tool electrode and the workpiece and moving the tool electrode towards the workpiece.

BACKGROUND OF THE INVENTION

Electric discharge machines are widely used to accurately machine a solid conductive workpiece into a mold or a die. The workpiece is fixed to a table arranged in a work tank, and a tool electrode of copper or graphite is attached to a vertically movable quill or ram using a tool holder. The work tank is filled with dielectric fluid such as kerosene, and the tool electrode is positioned extremely close to the workpiece. The space between the workpiece and the tool electrode is known as the machining gap, and the size of this gap typically ranges from a few $\mu$m to a few tens of $\mu$m. If a power pulse is applied across the workpiece and the tool electrode, during the pulse ON time, the insulation characteristics of the dielectric fluid in the gap break down and electric discharges occur. Microscopic amounts of the workpiece material are evaporated or become molten due to heat of this electric discharge, and flow into the dielectric fluid. Upon completion of the pulse ON time, i.e., during the power pulse OFF time, the insulation characteristics of the dielectric fluid in the gap are restored. As a result of the electric discharges produced during the pulse ON time, microscopic crater shaped holes remain in the surface of the workpiece. An electric discharge machining apparatus normally controls the pulse ON time and OFF time between 1 $\mu$sec and a few tens of msecs, whereby power pulses are repeatedly applied to the gap. The electric discharge machine causes the tool electrode to move towards the workpiece and along the Z axis in order to maintain the gap at a relatively constant size. Since it is possible to remove microscopic amounts of material from the workpiece without the tool electrode coming into contact with the workpiece, a cavity having good surface roughness and a shape complimentary to that of the tool electrode may be accurately formed in the workpiece. This type of electric discharge machine, known as a sinker EDM, is different from a wire EDM which uses a moving wire electrode.

During electric discharge machining, a flushing operation to produce a flow of dielectric fluid through the gap in order to wash fragments removed from the workpiece away from the gap is important. The flushing operation serves to prevent undesirable secondary discharges from occurring between the tool electrode and the fragments removed from the workpiece, and restores reliable insulation during the power pulse OFF time. A skilled operator may form holes for sucking contaminated dielectric out of the gap and supplying fresh dielectric fluid into the gap at appropriate positions in the tool electrode and the workpiece. When formation of the holes is restricted, such as because of the size or shape of the tool electrode, the operator may arrange an injecting device at an appropriate position to inject dielectric fluid towards the gap. Flushing is crucial in order to carry out good machining faster and more accurately; but creating a uniform flow throughout the entire gap requires skill. A technique known as a "jump" operation, where the tool electrode is caused to periodically rise up rapidly and fall down rapidly along the Z axis may be used to almost totally expel contaminated dielectric fluid inside the gap from the cavity inside the workpiece. During the jump operation, the tool electrode conventionally moves at a rate of a few hundred mm/min. If the reciprocating distance of the tool electrode is sufficiently large, more fresh fluid flows to the gap and more contaminated fluid is expelled from the gap. The tool electrode is preferably made to rise up by at least a depth of a hole being machined in the workpiece. However, since material is not removed from the workpiece during the jump operation, carrying out the jump operation too often will cause the stock removal rate to be lowered.

SUMMARY OF THE INVENTION

An object of the present invention is to provide an electric discharge machining apparatus that can effectively flush fragments removed from a workpiece away from a gap without lowering the stock removal rate.

Another object of the present invention is to provide an electric discharge machining apparatus that can effectively flush fragments removed from a workpiece away from a gap without the need for a high level of skill by the machine operator.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

In order to achieve the above and other objects, an electric discharge machine according to the present invention, for machining a workpiece by causing a tool electrode to move towards the workpiece in a vertical direction while causing electric discharge between the workpiece and the tool electrode, may comprise; a quill movable in the vertical direction, an electrode mounting device attached to a lower end of the quill coaxially with the quill for mounting the tool electrode, at least one set of linear motor movers attached to the quill and arranged symmetrically around the central axis of the quill, and a set of linear motor stators respectively facing the set of movers.

Preferably, the set of movers includes magnetic plates attached to the quill and a row of permanent magnets arranged on the magnetic plates, and the set of stators includes a yoke and a coil wound around the yoke.

More preferably, the quill has a hole in its center extending in the vertical direction, and an air cylinder for obtaining load equilibrium of the quill is arranged in this hole.

In another aspect of the present invention, an electric discharge machine, for machining a workpiece by causing a tool electrode to move towards the workpiece in a vertical direction while causing electric discharge between the workpiece and the tool electrode may comprise; a quill movable in the vertical direction having a density of less than about 4 g/cm$^3$, an electrode mounting device for fixing the tool electrode attached to a lower end of the quill, a linear motor mover attached to the quill, and a linear motor stator facing the linear motor mover.

PRESENTLY PREFERRED EMBODIMENT OF THE INVENTION

A presently embodiment of the invention will now be described with reference to FIG. 1, FIG. 2, FIG. 3 and FIG. 4.

Figure 1:
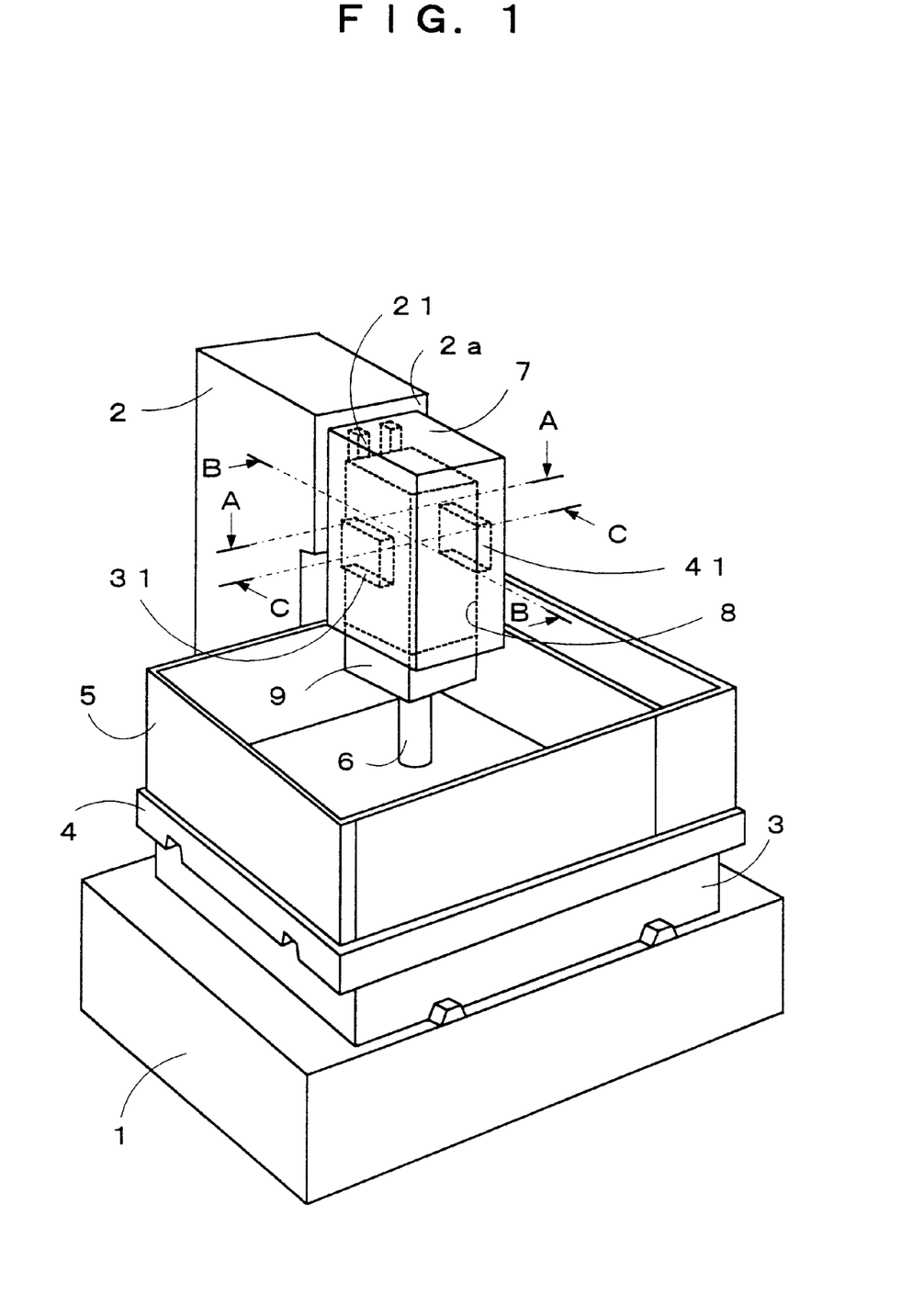
FIG. 1 is a perspective view showing one embodiment of an electric discharge machining apparatus of the present invention.
Figure 2:
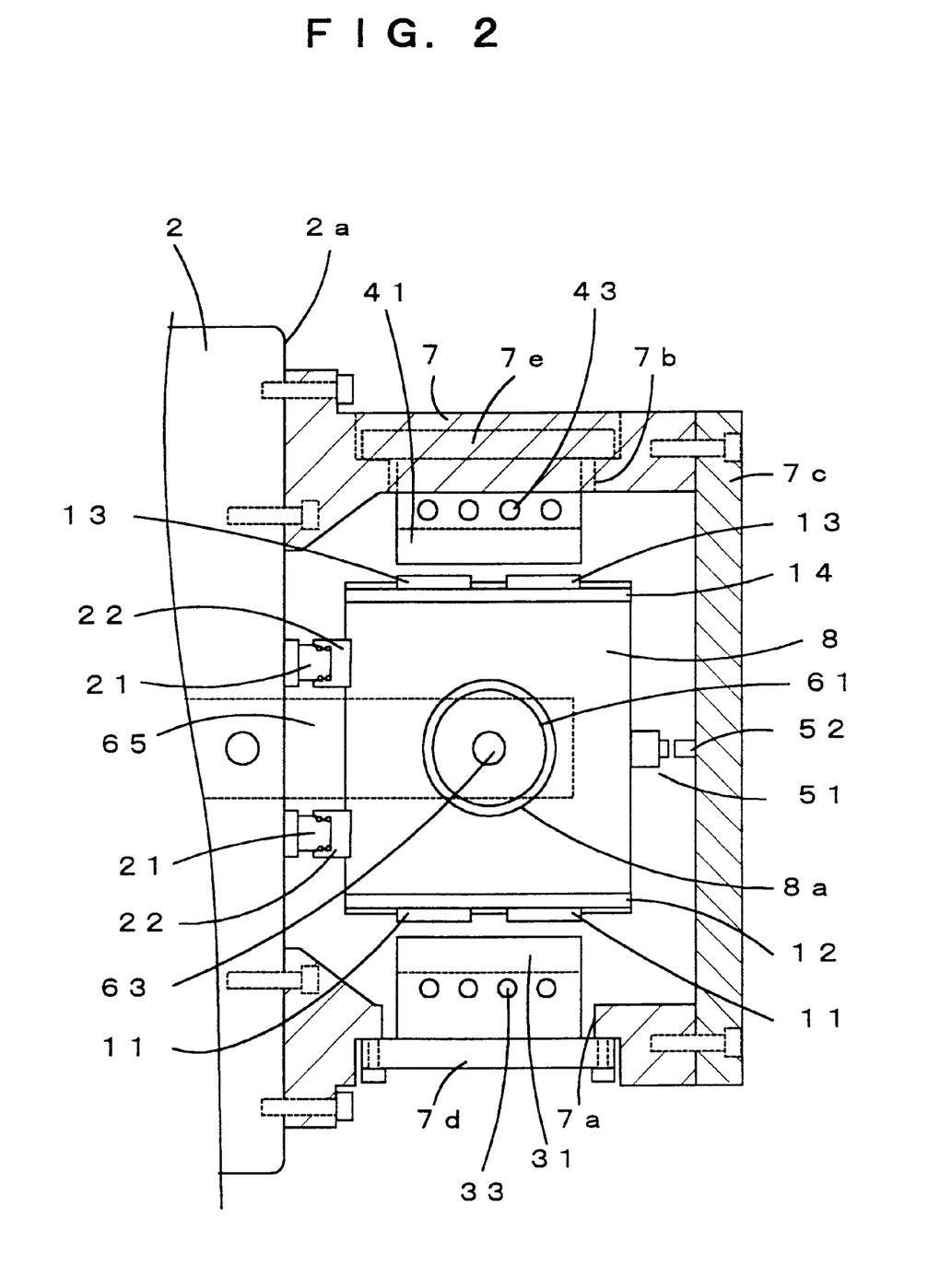
FIG. 2 is horizontal cross section of the quill driving device taken along line A—A in FIG. 1.
Figure 3:
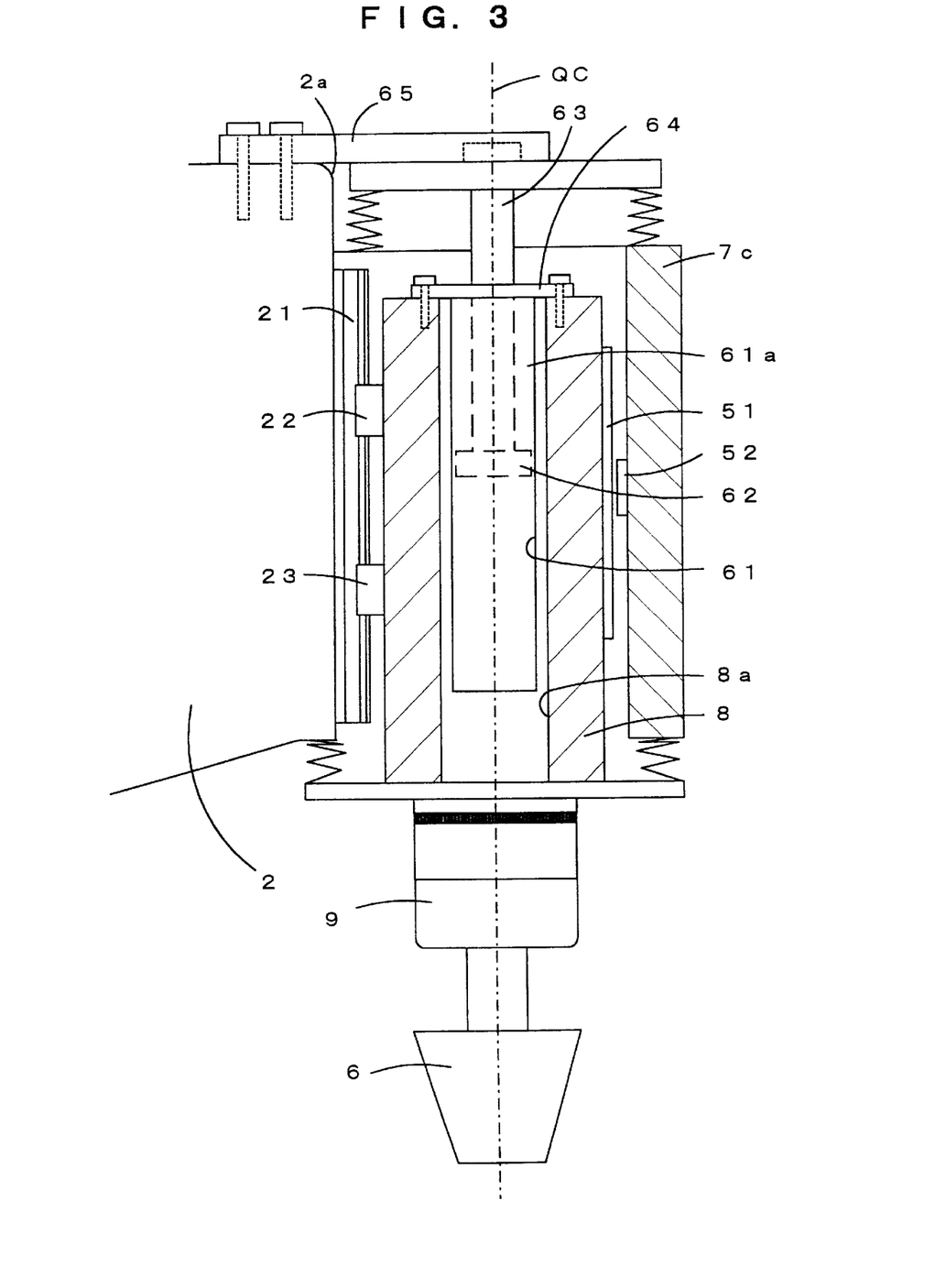
FIG. 3 is a vertical cross section of the quill driving device taken along line B—B in FIG. 1.
Figure 4:
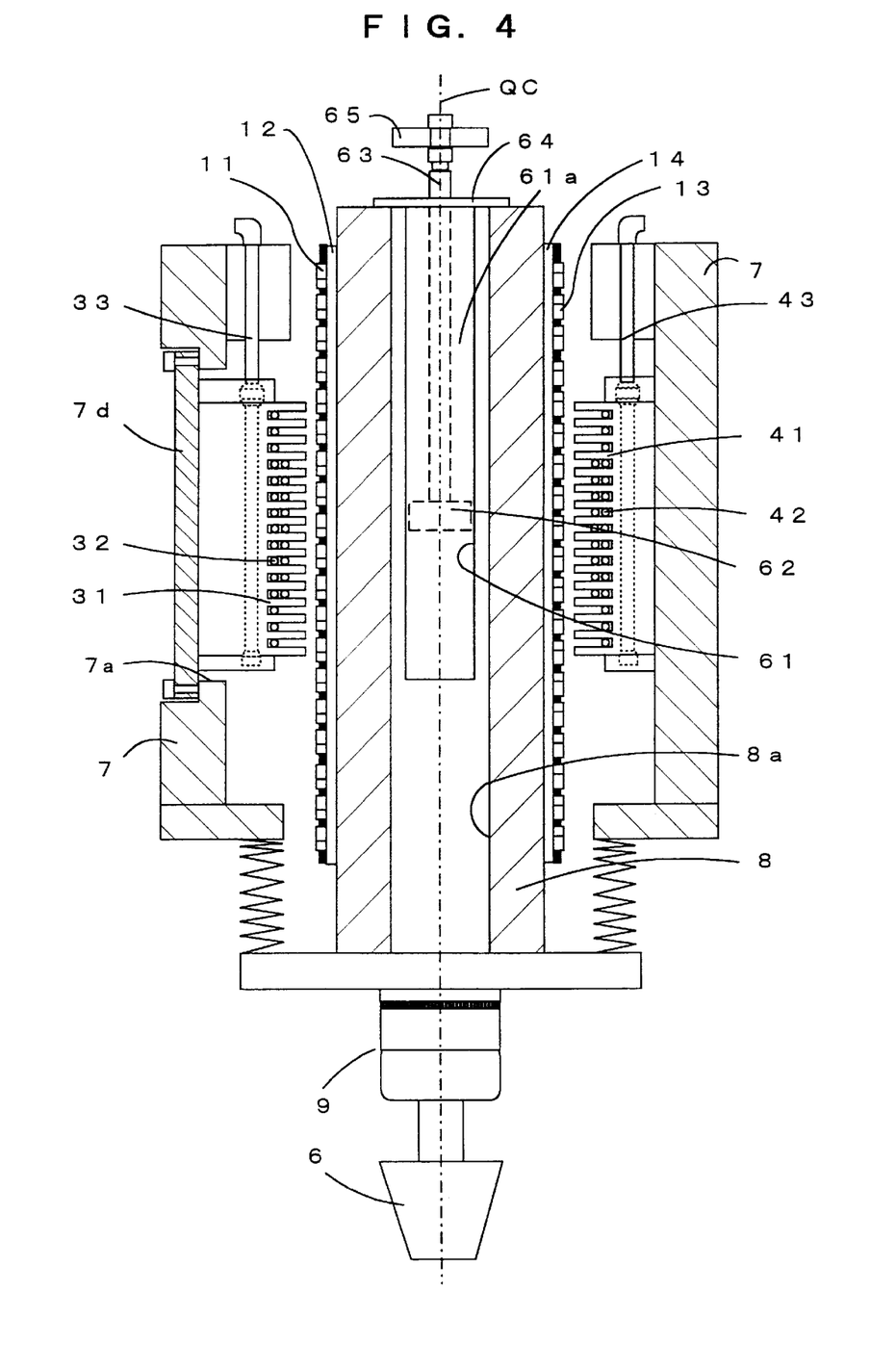
FIG. 4 is a vertical cross section of the quill driving device taken along line C—C in FIG. 1.

As shown in FIG. 1, column 2 is arranged on the back of a bed 1, and a moving body 3 is provided on the bed 1 to be movable in the Y axis direction. A saddle 4 is provided on the moving body 3 so as to be slidable in the X axis direction orthogonal to the Y axis. A work tank 5 filled with dielectric fluid is provided on the saddle 4. A workpiece (not shown in the drawing) is fixed to a table (not shown in the drawing) arranged in the work tank 5. A tool electrode 6 positioned close to the workpiece is fixed to an electrode mounting device 9. The electrode mounting device 9 is fixed to a lower end of a hollow quill 8 movable in the Z axis direction. In order to carry out a jump operation having a large amount of movement without lowering the stock removal rate, the electric discharge machining apparatus is capable of acceleration and deceleration in excess of 1 G, and of accurately moving the tool electrode 6 at a speed of 10 m/min or faster. As shown in FIG. 2, the quill 8 preferably has a square cross section. As shown in FIG. 3 and FIG. 4, the electrode mounting device 9 and the tool electrode 6 are arranged coaxially with the central axis QC of the quill 8, which means that the tool electrode 6 can be moved with good accuracy. A row of permanent magnets are arranged on both side walls of the square columnar quill 8 symmetrical about the central axis QC. In order to obtain high speed care must be taken to ensure that high rigidity is maintained and that the quill 8 is made light in weight. The quill 8 preferably has a cylindrical hole 8a in its center extending in the vertical direction, and has a density of 4 g/cm$^3$ or less. The quill is preferable made of ceramics having a small thermal expansion coefficient and a large Young's modulus. Specifically, silicon nitride ($Si_3N_4$) ceramics having a density of 3.2 g/cm$^3$, a Young's modulus of 3.0–3.1×10$^6$ kgf/cm$^2$, and a fracture toughness of 4.5–5.0 MPa·m½ is selected. One method of manufacturing the ceramics will be simply described. First, a sintering agent such as of aluminum oxide ($Al_2O_3$), silicon dioxide ($SiO_2$) or aluminum nitride (AlN) is added to particles of silicon nitride ($Si_3N_4$). This mixture is formed into a hollow square column using, for example, an isostatic press method. This compacted body is then sintered, preferably using either an atmospheric pressure sintering method or a pressurized sintering method. The quill 8 is preferably formed of a composite material of a light metal and at least 40% by volume of ceramics. The light metal may contain aluminum and/or magnesium, or alloys thereof. The ceramics may contain silicon carbide (SiC) ceramics, aluminum oxide ($Al_2O_3$) ceramics and/or silicon nitride ($Si_3N_4$) ceramics. A composite material of an aluminum alloy and 55% by volume of aluminum oxide ceramics has a density of 2.95 g/cm$^3$, a Young's modulus of 2.0×10$^6$ kgf/cm$^2$ and a fracture toughness of 10.5 MPa·m½. A composite material of an aluminum alloy and 55% by volume of aluminum oxide ceramics has a density of 3.00 g/cm$^3$, a Young's modulus of 2.65×10$^6$ kgf/cm$^2$ and a fracture toughness of 10.0 MPa·m½. These types of composite materials may be formed, for example, by causing a molten light metal to permeate into a ceramics sintered body in nitrogen at 700–800 C. The permanent magnets are placed on a magnet plate that is as thin as possible formed of a soft magnetic material such as iron, in order to form a good magnetic circuit between the permanent magnets. Some kind of member is also provided between the quill 8 and the magnet plate. In the illustrated embodiment, a magnet plate 12 on which two rows of permanent magnets 11 are arranged is adhered to one wall surface of the quill 8, and a magnet plate 14 on which two rows of permanent magnets 13 are arranged is adhered to the other side wall of the quill 8. In order to guide vertical movement of the quill 8, two linear motion ball bearing rails 21 disposed parallel to each other, are attached to the front surface 2a of the column 2. Upper and lower bearing blocks 22 and 23 which engage the rails 21, are attached to the rear surface of the quill 8. A frame 7, which supports stators facing the permanent magnets 11 and 13, is attached to the front surface 2a of the column 2.

As shown in FIG. 2 and FIG. 4, the stators may comprise an excitation coil and a yoke attached to respective vertical surfaces of plates 7d and 7e so as to be symmetrical about the central axis of the quill 8. The plates 7d and 7e are fixed into windows 7a and 7b respectively formed on opposite sidewalls of the frame 7. Yokes 31 and 41 preferably formed of laminated silicon steel sheets, are respectively attached to the plates 7d and 7e, and armature coils 32 and 42 are wound around the yokes 31 and 42 respectively. A gap between the yoke 31 and the permanent magnet 11 and a gap between the yoke 41 and the permanent magnet 13 are adjusted so as to be the same size. For example, these two gaps may be adjusted to the same size using a plurality of screws provided in the plates 7d and 7e. As a result, a magnetic attraction force generated between the movers and stators of a linear motor is offset. A number of pipes 33 and 43 through which coolant passes are fitted into holes formed inside the yokes 31 and 41. A linear scale 51 is attached to a side wall of the quill 8 and a sensor 52 for reading the position of the quill are provided on an inner side of the front wall 7c of the frame 7. A driver of the linear motor (not shown) receives detection signals from the sensor 52 and supplies control signals to the armature coils 32 and 42. A cylinder 61 is provided for balancing the load applied to the movable quill 8 when moving at a gravitational acceleration in excess of 1 G. In order to make the machine compact, the cylinder 61 is located inside a hole 8a coaxial with the central axis QC, and an upper end of the cylinder 61 is fixed to the quill 8 using a flange. Because the cylinder 61 is provided next to the quill 8, high responsiveness is ensured. A piston rod 63 is connected at one end to a piston 62, and at the other end to a linking plate 65. The linking plate 65 is fixed to the column 2. The pressure in the upper chamber 61*a* formed inside the cylinder 61 above the piston 62 is maintained at a fixed value by precise air regulators. Because of the cylinder 61, electric power supplied to the coils 32 and 42 may be conserved while the quill is stationary. In order to prevent encroachment of dust, a number of bellows are preferably provided in the gaps between the quill 8 and the frame 7.

Figure 5:
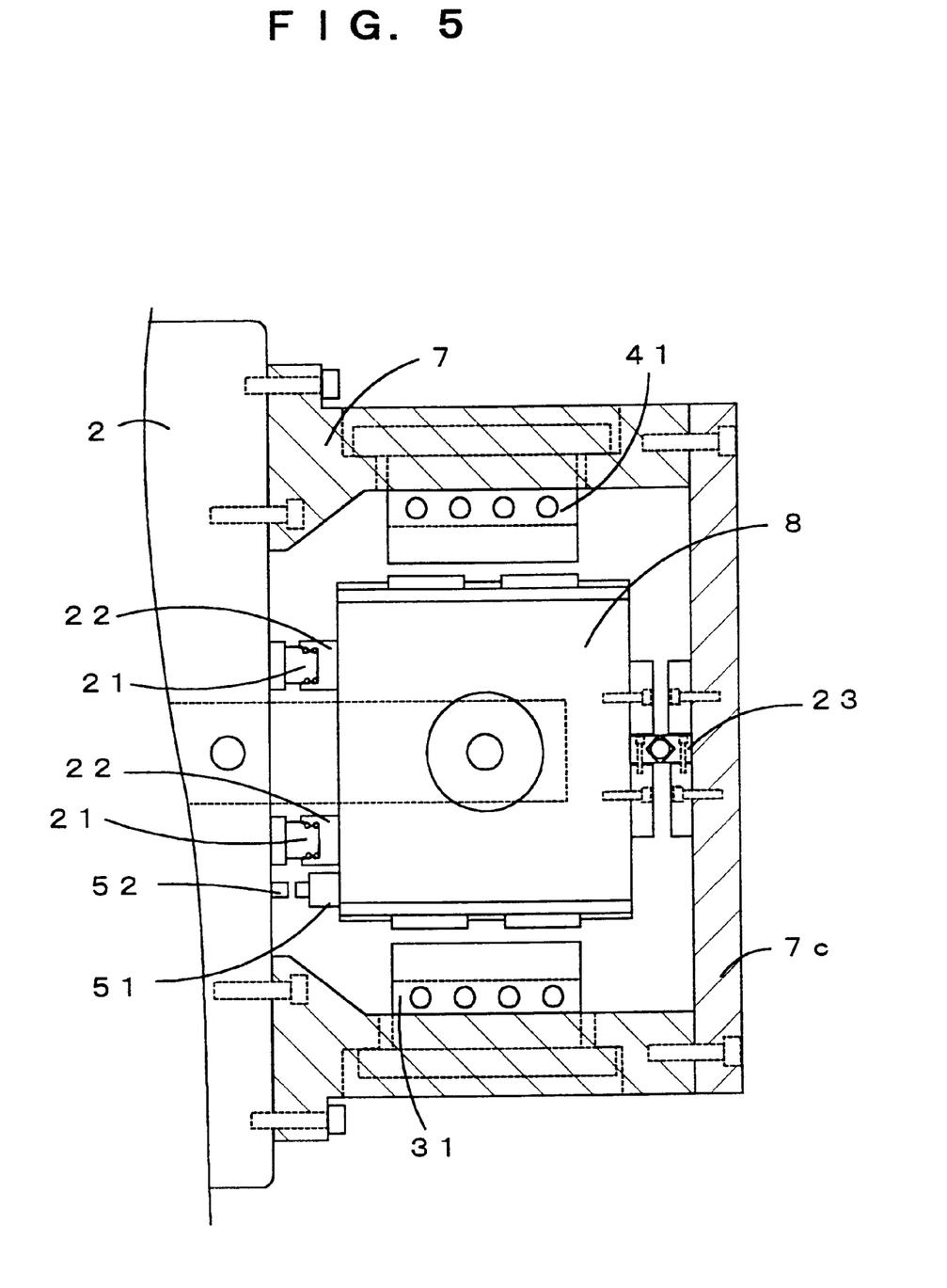
FIG. 5 is a horizontal cross section of another example of a quill guiding device taken along line A—A in FIG. 1.

The device for guiding the quill 8, and the location of the linear scale 51, etc. are not limited to the embodiment shown in FIG. 2, FIG. 3 and FIG. 4. For example, as shown in FIG. 5, it is also possible to additionally provide a cross roller bearing for guiding vertical movement of the quill 8 between the front wall of the quill 8 and the front wall 7*c* of the frame 7. It is also possible to provide the linear scale 51 of the rear wall of the quill 8, and to provide the sensor 52 for detecting the position of the quill on the front surface 2*a* of the column 2.

Figure 6:
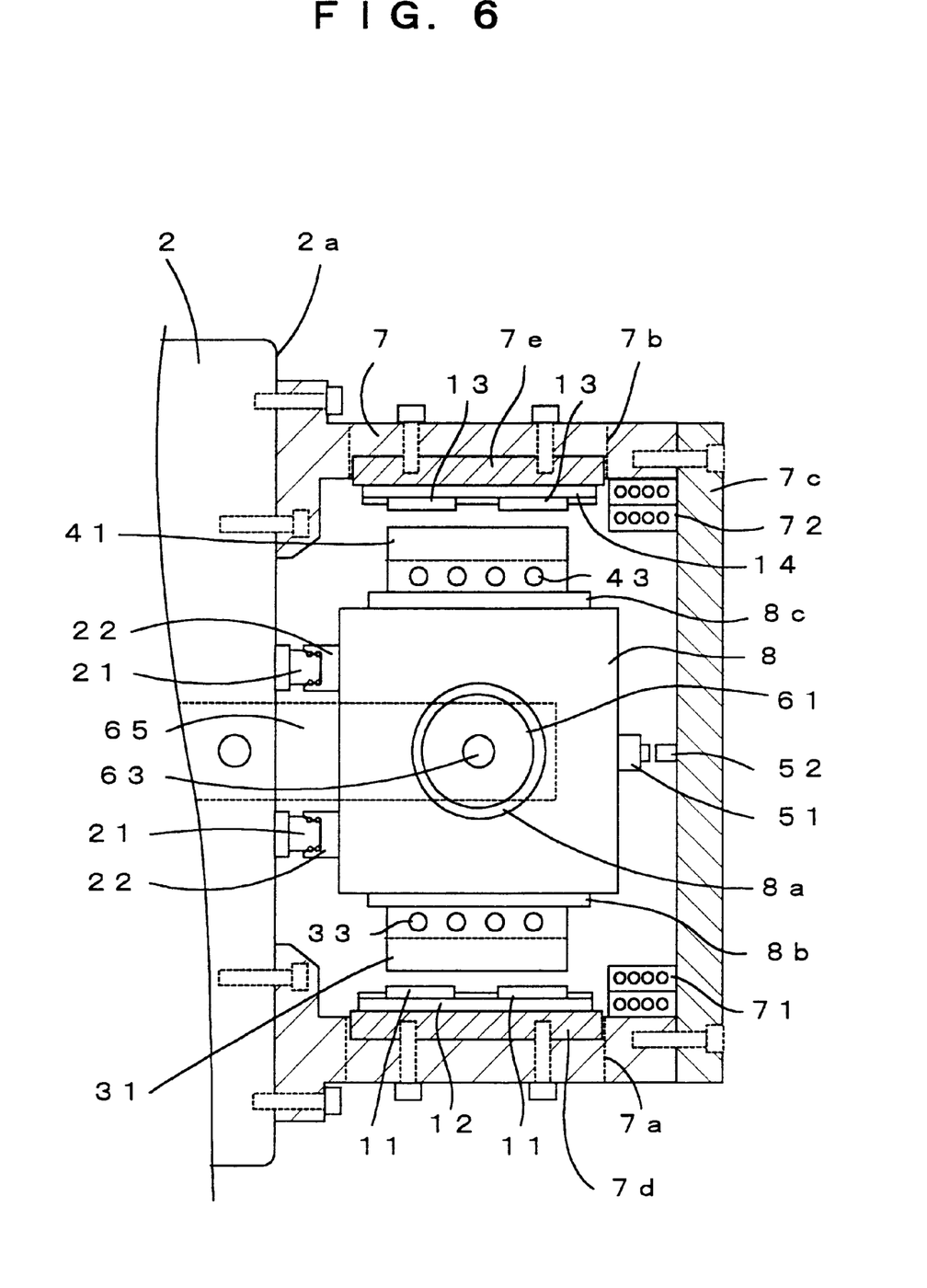
FIG. 6 is a vertical cross section of another example of a quill driving device taken along line A—A in FIG. 1.
Figure 7:
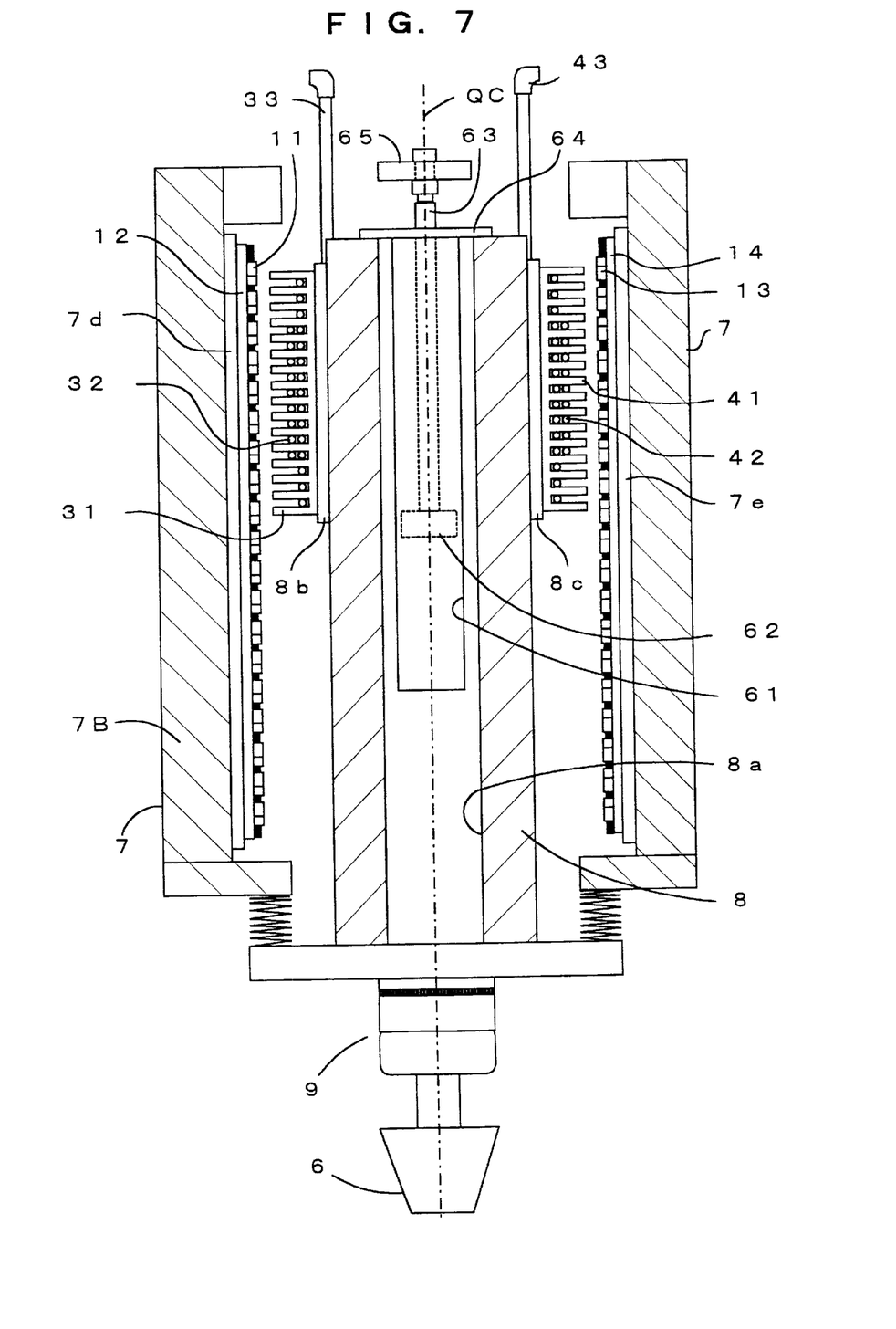
FIG. 7 is a vertical cross section of another example of a quill driving device taken along line C—C in FIG. 1.

As shown in FIG. 6 and FIG. 7, the yokes 31 and 41 may be attached to both walls of the quill 8 using plates 8*b* and 8*c*. In this case, the magnet plate 12 to which the permanent magnet 11 opposite the yoke 31 is attached, is supported on the frame 7 using the plate 7*d*. The magnet plate 14 to which the permanent magnet 13 opposite the yoke 41 is attached is supported on the frame 7 using the plate 7*e*. A flexible hose extending from the coolant tubes 33 and 43, and a power supply line extending from the coils 32 and 42, are connected to terminals 71 and 72.

Figure 8:
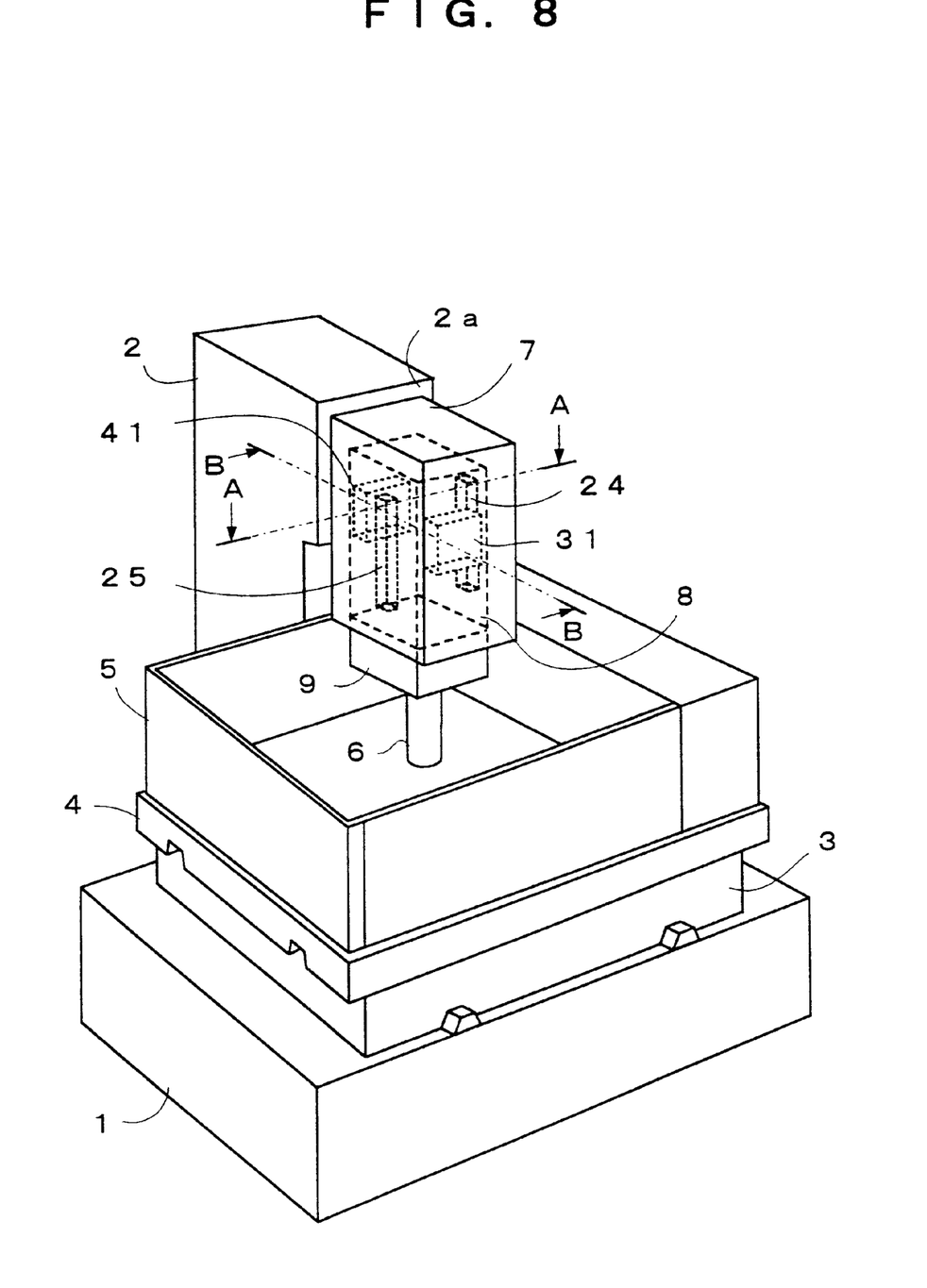
FIG. 8 is a perspective view showing another embodiment of an electric discharge machining apparatus of the present invention.
Figure 9:
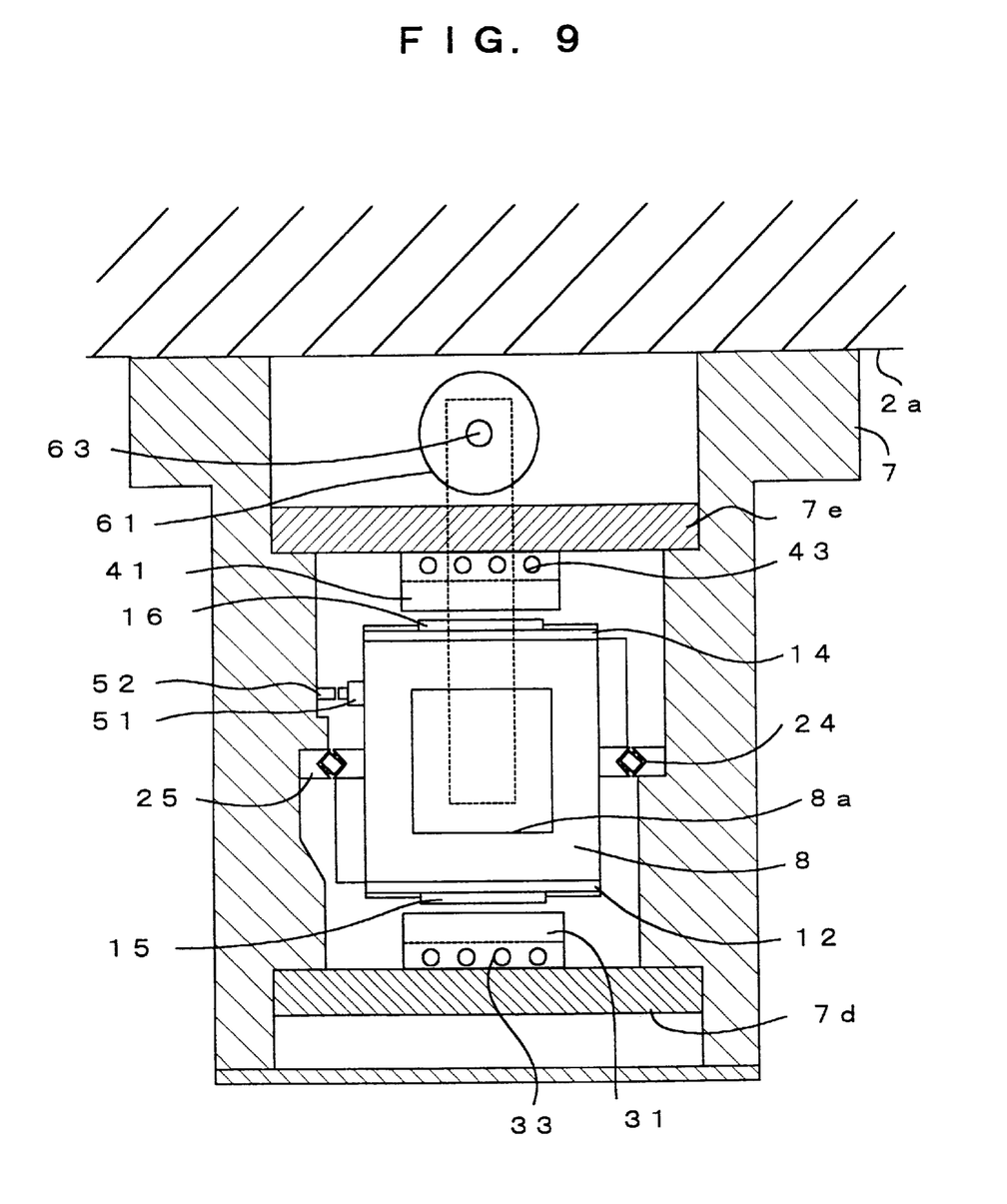
FIG. 9 is horizontal cross section of the quill driving device taken along line A—A in FIG. 8.
Figure 10:
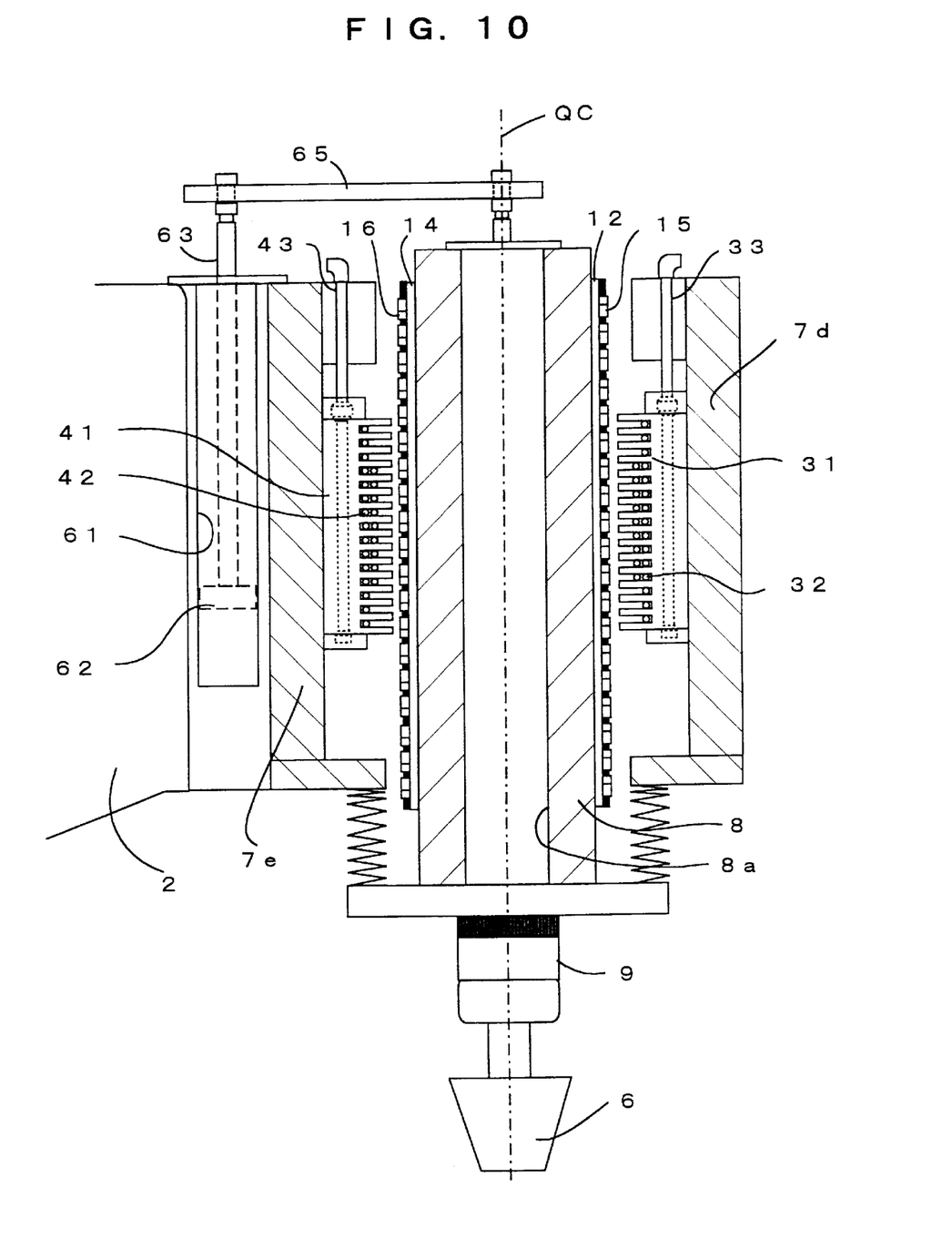
FIG. 10 is a vertical cross section of a quill driving device taken along line B—B in FIG. 8.
Figure 11:
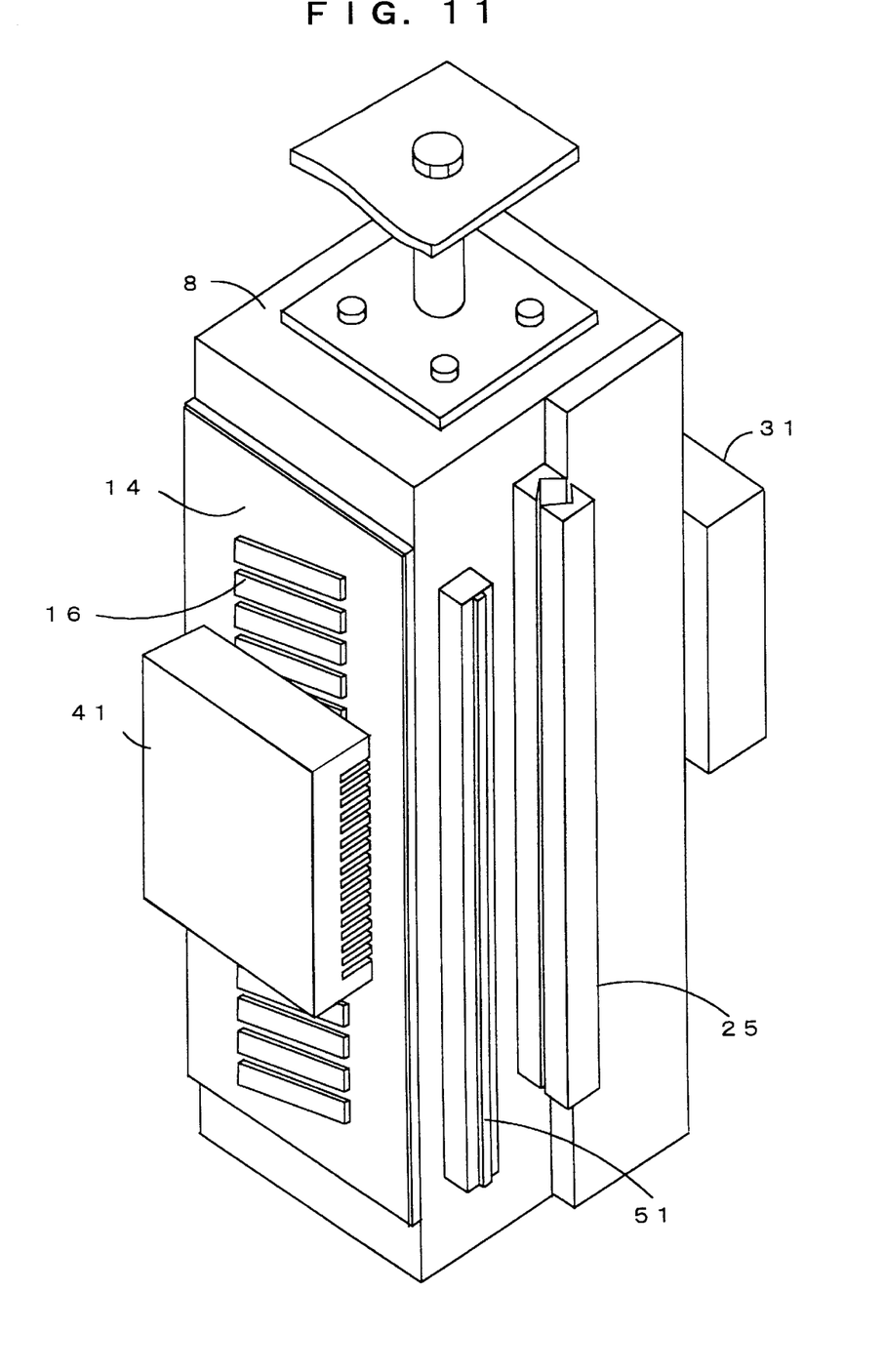
FIG. 11 is a perspective view showing the quill driving device of FIG. 8.
Figure 12:
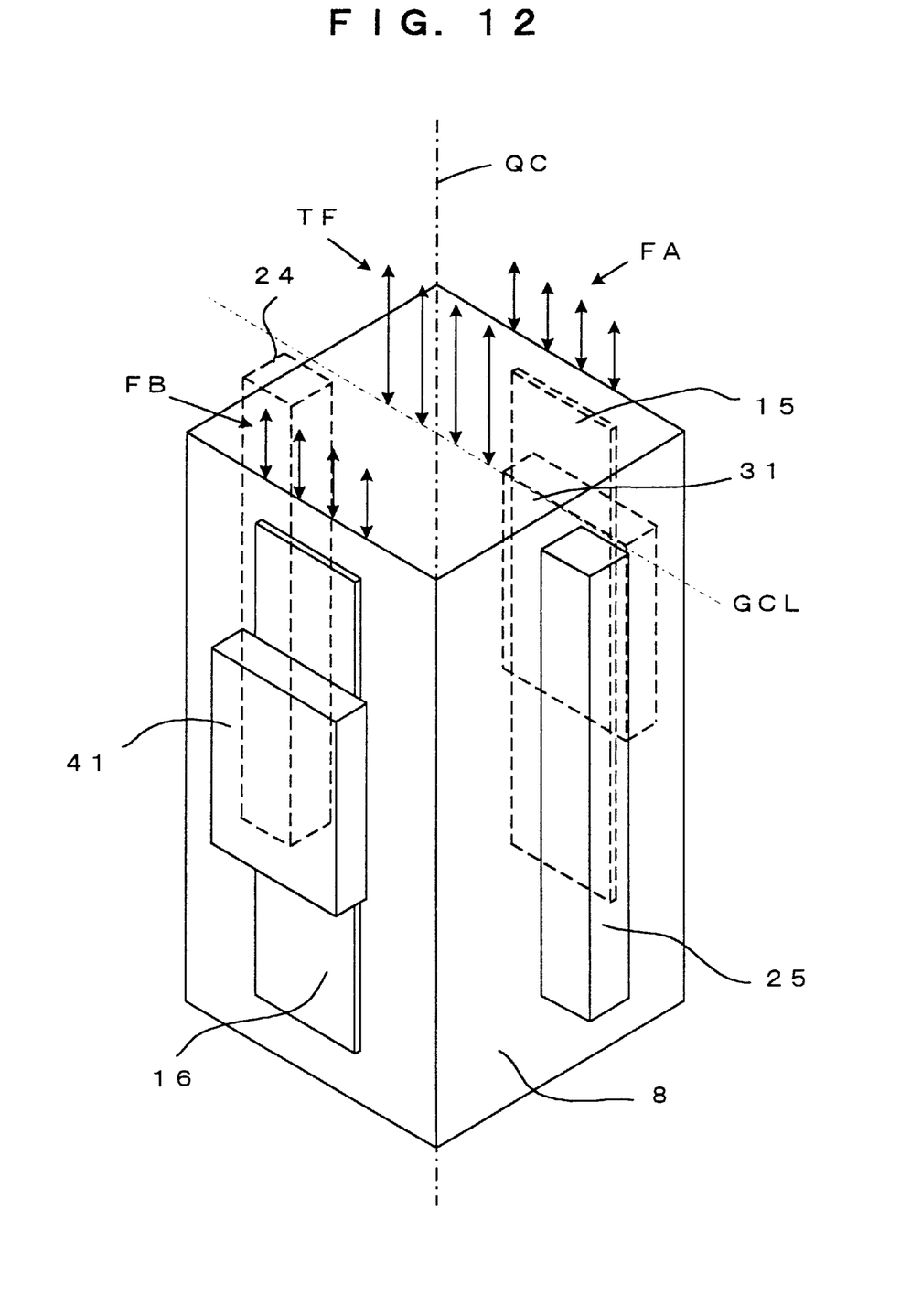
FIG. 12 is a perspective view showing thrust acting on quill of FIG. 8.

Another embodiment of an electric discharge machine of the present invention will now be described with reference to FIG. 8, FIG. 9, FIG. 10. FIG. 11 and FIG. 12. Elements that are the same as those in FIG. 1, FIG. 2, FIG. 3, FIG. 4, FIG. 5, FIG. 6 and FIG. 7 have the same reference numerals attached thereto, and explanation thereof will be omitted.

Magnet plates 12 and 14 to which rows of permanent magnets 15 and 16 are respectively adhered are respectively attached to the front wall and rear wall of a square columnar quill 8. As shown in FIG. 11, individual permanent magnets are adhered to the magnet plate inclined slightly from the horizontal direction, so as to reduce torque ripple. In this embodiment, the quill 8 has a square hole 8*a* coaxial with the central axis QC, to reduce its weight. Linear cross roller guides 24 and 25 for guiding the quill 8 are provided between the two side surfaces of the quill and the frame 7. As clearly shown in FIG. 10, a cylinder 61 for obtaining load equilibrium of the quill 8 is provided between a plate 7*e* attached to the yoke 41 and the column 2. A piston rod 63 is connected to the quill 8 using a linking plate 65. The forces for driving the quill 8 will now be described in detail with reference to FIG. 12. Reference numeral GCL represents a centerline about which the rows of permanent magnets 15 and 16 are symmetrically arranged. A resultant force TF, from thrust FA developed between the row of permanent magnets 15 and the yoke 31 and the thrust FB developed between the row of permanent magnets 16 and the yoke 41, acts on the quill centerline GCL. The linear cross roller guides 24 and 25 are arranged so that the respective guide surfaces cause guiding force to act on the centerline GCL. Accordingly, no force other than in the vertical direction acts on the linear cross roller guides 24 and 25 for guiding the quill 8. A lightweight quill can therefore be moved in the vertical direction at high speed and with good accuracy.

Holes having a depth of 70 mm were machined in a workpiece using a rib-shaped graphite tool electrode having a width of 1.0 mm at the bottom surface and a length of 38 mm, and a 1° slope at each side surface. At this time, power pulse ON time was set to 100 $\mu$s, power pulse OFF time set to 140 $\mu$s, peak current value set to 93A, mean gap voltage set to 55V, no load voltage set to 120V, jump rate set to 30 m/min., and the jump time for one cycle was set to 0.24 seconds. The material properties of the workpiece are defined in Japanese Industrial Standard SKD 11. Even without flushing the electric discharge machining apparatus, the machining rate was maintained almost constant and machining was completed in 135 minutes.

Figure 13:
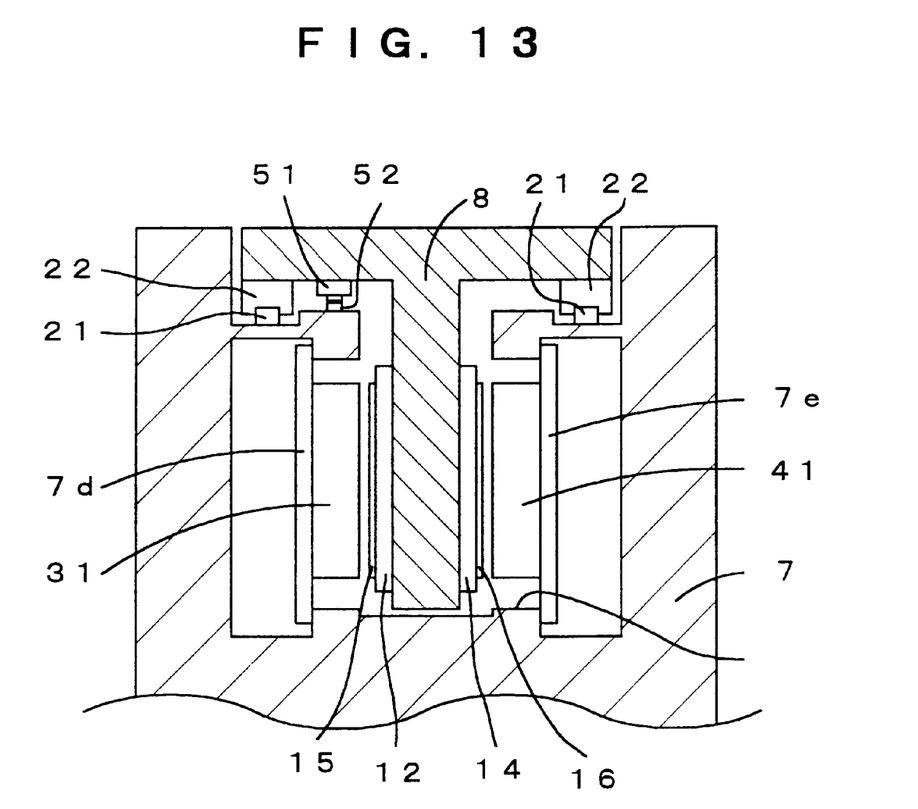
FIG. 13 is a horizontal cross section showing another example of a quill of the electric discharge machining apparatus.

The foregoing description of various preferred embodiments of the invention has been presented for the purposes of illustration and description. It is not intended to be exhaustive or to limit the invention to the precise form disclosed, and obviously modifications and variations are possible in light of the above teaching. For example, the horizontal cross section of the quill is not limited to being square. The cross section can, for example, be rectangular, and as shown in FIG. 13, it is possible to be formed having two vertical surfaces that are parallel to each other. It is intended that the scope of the invention be defined by the appended claims.

What is claimed is:

1. An electric discharge machining apparatus for machining a workpiece by causing a tool electrode to move towards the workpiece in a generally vertical direction while causing electric discharges between the workpiece and the tool electrode, said apparatus comprising:
   a quill movable in the vertical direction;
   an electrode mounting device attached to a lower end of the quill coaxially with the quill, for mounting the tool electrode;
   at least one set of linear motor movers attached to the quill and arranged symmetrically about the central axis of the quill; and
   a set of linear motor stators, respectively facing the set of movers.

2. The electric discharge machining apparatus of claim 1, wherein the set of movers include a magnetic plate fitted to the quill and a row of permanent magnets arranged on the magnetic plate, and the set of stators include a yoke and a coil wound around the yoke.

3. The electric discharge machining apparatus of claim 1, wherein the quill has a square, columnar shape.

4. The electric discharge machining apparatus of claim 1, further comprising a hole extending in a vertical direction formed in the center of the quill.

5. The electric discharge machining apparatus of claim 3, further comprising a first guide device for guiding the quill, said first guide device being disposed at a first side surface of the quill, and wherein the set of movers are respectively fixed to the side surfaces of the quill adjacent to the first side surface.

6. The electric discharge apparatus of claim 1, further comprising an air cylinder and piston arranged to balance the load on the quill.

7. The electric discharge apparatus of claim 4, further comprising an air cylinder and piston arranged to balance the load on the quill.

8. The electric discharge machining apparatus of claim 5, further comprising a second guide device, disposed at a side surface of the quill facing the first side surface, for guiding the quill.

9. The electric discharge machining apparatus of claim 1, wherein the set of movers includes a yoke and a coil wound around the yoke, and the set of stators includes a magnetic plate fitted to the quill and a row of permanent magnets arranged on the magnetic plate.

10. The electric discharge machining apparatus of claim 1, wherein the quill has a density of about 4 g/cm$^3$ or less.

11. The electric discharge machining apparatus of claim 10, wherein the quill is made of ceramics.

12. The electric discharge machining apparatus of claim 11, wherein the quill is made of silicon nitride ($Si_3N_4$).

13. The electric discharge machining apparatus of claim 10 wherein the quill is made of a composite material of a light metal and at least 40% by volume of ceramics.

14. An electric discharge machining apparatus, for machining a workpiece by causing a tool electrode to move towards the workpiece in a vertical direction while causing electric discharge between the workpiece and the tool electrode, said apparatus comprising:

a quill having a density of less than 4 g/cm$^3$ movable in the vertical direction;

an electrode mounting device, attached to a lower end of the quill, for fixing the tool electrode;

a linear motor mover attached to the quill; and a linear motor stator facing the mover.

15. The electric discharge machining apparatus of claim 14, wherein the quill is made of ceramics.

16. The electric discharge machining apparatus of claim 15, wherein the quill is made of silicon nitride ($Si_3N_4$).

17. The electric discharge machining apparatus of claim 14 wherein the quill is made of a composite material of a light metal and at least 40% by volume of ceramics.

* * * * *